(12) United States Patent
Chi et al.

(10) Patent No.: US 9,117,350 B2
(45) Date of Patent: Aug. 25, 2015

(54) MOBILE TERMINAL

(71) Applicant: LG ELECTRONICS INC., Seoul (KR)

(72) Inventors: Jumin Chi, Seoul (KR); Sohoon Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 14/140,948

(22) Filed: Dec. 26, 2013

(65) Prior Publication Data

US 2014/0335912 A1 Nov. 13, 2014

(30) Foreign Application Priority Data

May 9, 2013 (KR) .................. 10-2013-0052657

(51) Int. Cl.
*H04M 1/00* (2006.01)
*G08B 5/22* (2006.01)
*H04M 1/02* (2006.01)
*H04M 1/23* (2006.01)
*H04B 7/00* (2006.01)

(52) U.S. Cl.
CPC .............. *G08B 5/224* (2013.01); *H04M 1/0202* (2013.01); *H04M 1/0266* (2013.01); *H04M 1/236* (2013.01); *H04M 2250/16* (2013.01); *H04M 2250/18* (2013.01)

(58) Field of Classification Search
CPC .................. H04M 1/72597; H04M 19/048
USPC ..................................... 455/566, 567
See application file for complete search history.

(56) References Cited

U.S. PATENT DOCUMENTS

2005/0018688 A1   1/2005   Takeda et al.
2010/0283860 A1  11/2010   Nader

FOREIGN PATENT DOCUMENTS

CA      2821093 A1   6/2012

*Primary Examiner* — Lee Nguyen
(74) *Attorney, Agent, or Firm* — Birch, Stewart, Kolasch & Birch, LLP

(57) ABSTRACT

A mobile terminal including a terminal body having a front surface and a rear surface; a front notification unit and a rear notification unit formed on the front surface and the rear surface, respectively, and configured to notify events generated in the mobile terminal using light emitted from light sources; a display module formed on the front surface together with the front notification unit; and a controller configured to selectively operate the front notification unit and the rear notification unit according to a placed status of the terminal body.

20 Claims, 15 Drawing Sheets

FIG. 5

| EVENT | STATUS OF THE TERMINAL BODY | | |
|---|---|---|---|
| | FIRST STATUS | SECOND STATUS | THIRD STATUS |
| CHARGING (CONNECTED TO TA/USB) | FRONT LED | BACK LED | FRONT LED |
| POWER ON | FRONT LED | N/A | FRONT LED |
| POWER OFF | FRONT LED | N/A | FRONT LED |
| LCD AWAKE KEY | FRONT LED | N/A | FRONT LED |
| ALARM | FRONT LED | BACK LED | FRONT LED |
| INCOMING CALL | FRONT LED | BACK LED | BOTH |
| MISSED NOTIFICATION | FRONT LED | BACK LED | FRONT LED |

(a)

(b)

(c)

(a)

(b)

(c)

(d)

MOBILE TERMINAL

CROSS-REFERENCE TO A RELATED APPLICATION

Pursuant to 35 U.S.C. §119(a), this application claims the benefit of earlier filing date and right of priority to Korean Application No. 10-2013-0052657, filed on May 9, 2013, the contents of which is incorporated by reference herein in its entirety.

BACKGROUND OF THE INVENTION

1. Field of the Invention

This present invention relates to a mobile terminal having a notification unit for notifying an event generated in the terminal and corresponding method.

2. Background of the Invention

Terminals may be divided into mobile/portable terminals and stationary terminals according to their mobility. Also, the mobile terminals may be categorized into a handheld terminal and a vehicle mount terminal according to whether it is directly portable by a user.

As it becomes multifunctional, the mobile terminal can be allowed to capture still images or moving images, play music or video files, play games, receive broadcast and the like, so as to be implemented as a multimedia player.

Various new attempts have been made for the multimedia devices by hardware or software in order to implement such complicated functions. For example, a user interface environment is provided in order for users to easily and conveniently retrieve or select functions.

Furthermore, as a mobile terminal is considered as a personal belonging for expressing one's own personality, various design forms are required. The design forms include structural changes and improvements for the user to more conveniently use the mobile terminal. As one of the structural changes and improvements, a notification unit may be taken into account.

A manipulation unit disposed on a front surface of the terminal ruins a slim simple design of the terminal. Also, a manipulation unit on a side surface of the terminal causes a reduction of a display area. Therefore, a new structure of input method capable of overcoming those drawbacks may be considered.

SUMMARY OF THE INVENTION

Therefore, an aspect of the detailed description is to provide a mobile terminal capable of notifying an event generation irrespective of an oriented (placed) status of the terminal.

Another aspect of the detailed description is to provide a mobile terminal allowing a new type of user input which is different from the related art user input.

To achieve these and other advantages and in accordance with the purpose of this specification, as embodied and broadly described herein, there is provided a mobile terminal including a terminal body having a front surface and a rear surface, a front notification unit and a rear notification unit formed on the front surface and the rear surface, respectively, and configured to notify events generated in the terminal using light emitted from light sources, a display module formed on the front surface together with the front notification unit, and a controller configured to control the front notification unit and the rear notification unit to operate according to a placed status of the terminal body.

In accordance with one embodiment, the front notification unit may operate in a first status that the terminal body is placed with the front surface up, and the rear notification unit may operate in a second status that the terminal body is placed with the rear surface up. At least one of the front notification unit and the rear notification unit may operate during an incoming call in a third status that the terminal body is inclined.

In accordance with another embodiment, the rear notification unit may operate when the event is generated in the second status that the terminal body is placed with the rear surface up, and the front notification unit may operate when the terminal body is switched into the first status after the rear notification unit operates.

In accordance with another embodiment, the rear notification unit may be flickering to notify generation of a plurality of events when the plurality of events are generated.

In accordance with another embodiment, the mobile terminal may further include a user input unit disposed on the rear surface and having at least one button to sense an input of a control command, and the rear notification unit may be provided on the user input unit. The terminal may be switched into an unlocked state when the button is pushed into an unlocking pattern in a locked state of the terminal.

In accordance with another embodiment, a first audio output module may be disposed on the front surface and a second audio output module may be disposed on at least one of the rear surface and a side surface of the terminal. The second audio output module may operate when an incoming call is generated in the second status that the terminal body is placed with the rear surface up.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 5 is a table illustrating an example of controlling front and rear notification units according to a placed status of the terminal;

DETAILED DESCRIPTION OF THE INVENTION

Hereinafter, a mobile terminal associated with the present invention will be described in more detail with reference to the accompanying drawings. Hereinafter, suffixes "module" and "unit or portion" for components used herein in description are merely provided only for facilitation of preparing this specification, and thus they are not granted a specific meaning or function.

A mobile terminal disclosed herein may include a laptop computer, a tablet PC, a mobile phone, a smart phone, a digital broadcast terminal, a personal digital assistant (PDA), a portable multimedia player (PMP), a navigator, and the like.

Figure 1:
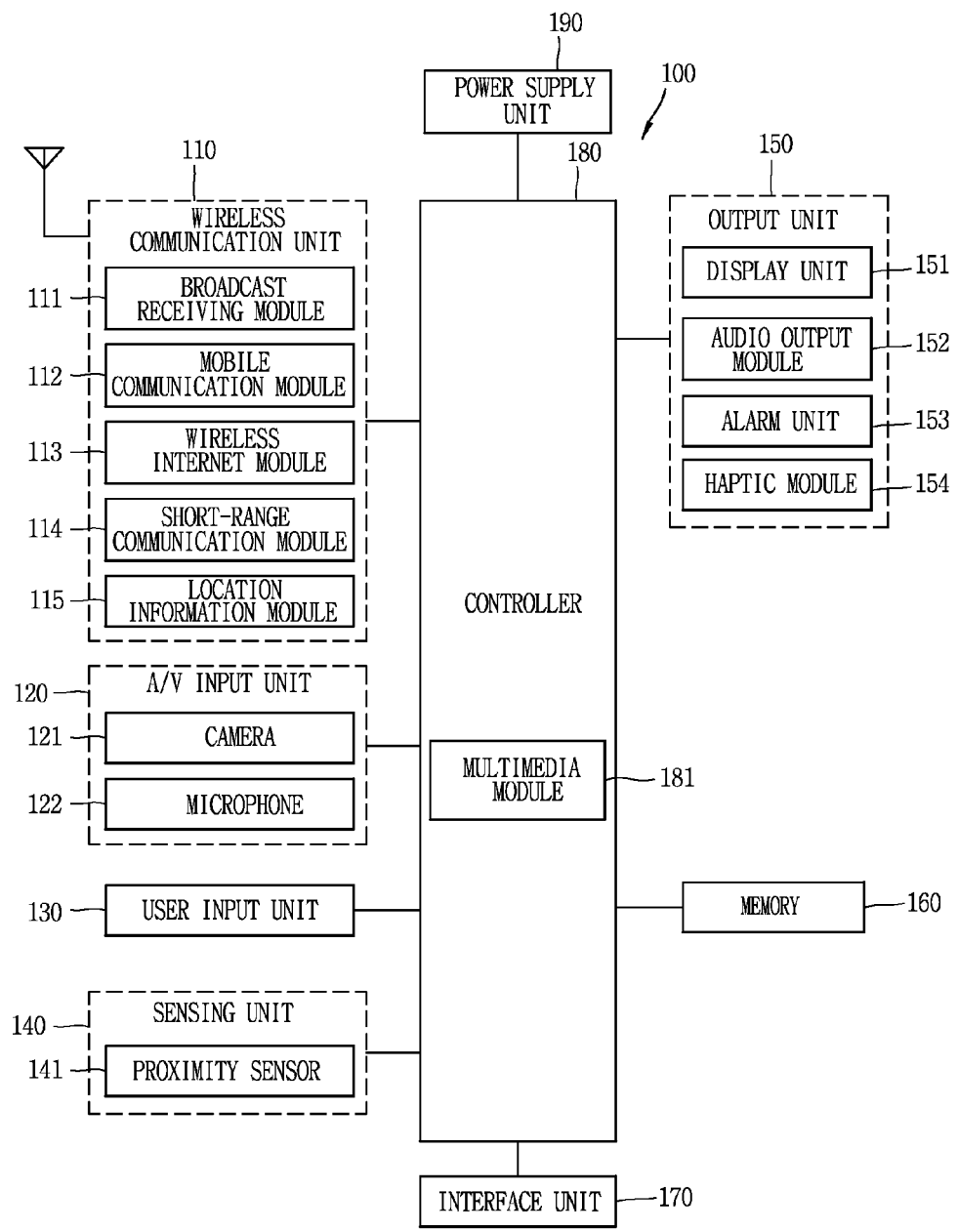
FIG. 1 is a block diagram of a mobile terminal in accordance with one embodiment of the present invention.

FIG. 1 is a block diagram of a mobile terminal in accordance with one embodiment.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this embodiment, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, such as a GPS module.

Referring to FIG. 1, the A/V input unit 120 receives an audio or video signal, and the A/V input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, existence or non-existence of a user contact, an orientation of the mobile terminal 100 and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of those displays may be configured with a transparent or optical transparent type to allow viewing of the exterior through the display unit, and such displays may be called transparent displays. An example of a typical transparent display may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

In embodiments where the display unit 151 and a touch sensitive sensor (referred to as 'touch sensor') have an inter-layer structure, the structure may be referred to as a 'touch screen'. The display unit 151 may be used as an input device in addition to being used as an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor may sense a presence or absence of an object approaching a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch," whereas a status that the pointer substantially comes in contact with the touch screen will be referred to as "contact touch." For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The terminal may include a light sensor, a gyro sensor and the like as well as the proximity sensor. The light sensor may measure an amount of ambient light. The gyro sensor is also called an acceleration sensor which may measure velocity and location of a moving terminal.

The audio output module 152 may output audio data received from the wireless communication unit 110 or stored in the memory 160 in a call-receiving mode, a call-placing mode, a recording mode, voice recognition mode, a broadcast reception mode, and the like. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include a call received, a message received, a key signal input, a touch input, and the like. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Explaining the user input unit 130 again, the user input unit 130 according to the present invention may be disposed on the rear surface of the terminal so as to implement the front display into a larger screen. Hereinafter, description will be given in more detail, of a detailed structure that the user input unit 130 is disposed on the rear surface and operations implemented thereby.

Figure 2A:
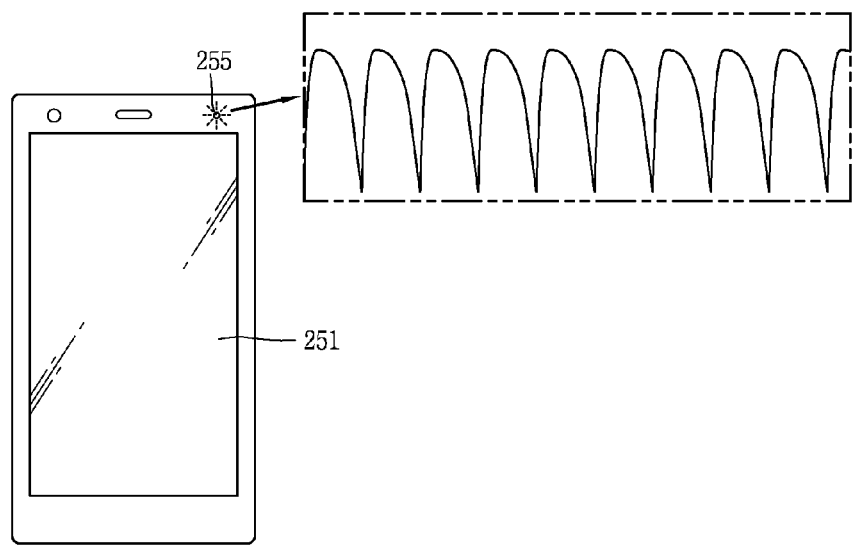
FIGS. 2A and 2B are conceptual views illustrating operations implemented by the present invention.
Figure 2B:
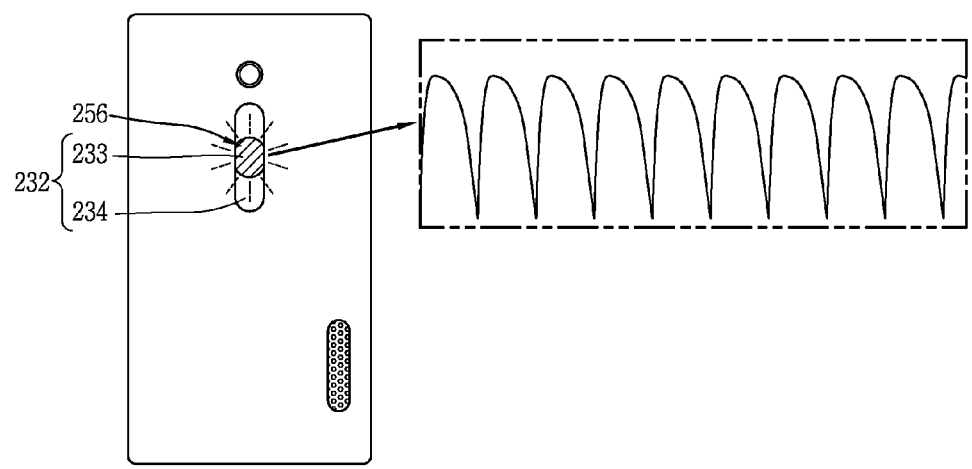

FIGS. 2A and 2B are conceptual views illustrating operations implemented by the present invention.

As illustrated in FIGS. 2A and 2B, the terminal may include a display module 251 disposed on one surface of a main body, for example, on a front surface. The display module 251 may output a graphic user interface (GUI) of an application which is being currently executed. The display module 251 may include a touch sensor to sense a touch input onto the GUI. The display module 251 may output, together with the GUI, visual information implemented in form of an image, text, an icon and the like, or be switched (converted) into an inactive (deactivated) state after the lapse of a preset time or in response to an input of a predetermined control command.

Referring to FIG. 2A, a rear input unit 232 may be disposed on another surface of the main body, for example, on a rear surface. The rear input unit 232 is an example of a user input unit, and may include at least one button 233, 234.

The first button 233 may be a power key to power the display module 251 on or off. Therefore, a control command for the display module 251 may be received by the rear input unit 232. In addition, the power-on or power-off of the terminal itself may also be realized by the first button 233.

The second button 234 may be a volume adjustment button. For example, when a push input is applied onto the second button 234, a volume bar may be output and a volume may be adjusted by manipulation of the second button 234.

Referring to the drawings, a front notification unit 255 and a rear notification unit 256 may be formed on the front surface and the rear surface of the terminal, respectively. The front notification unit 255 and the rear notification unit 256 may notify events generated in the terminal using light emitted from light sources. In this case, the front notification unit 255 may be configured to selectively output light of a plurality of colors, and the rear notification unit 256 may be configured to output light of a single color. However, the present invention may not be limited to this. The rear notification unit 256 may also be configured to selectively output light of a plurality of colors.

Here, the first button 233 may be made of a transparent material such that light emitted from a light source within the terminal can be transmitted to the outside, and the rear notification unit 256 may be referred to as a combination thereof. In addition, the second button 234 may be made of an opaque material to prevent leakage of the light. However, the present invention may not be limited to this. The rear notification unit 256 may be configured, separate from the rear input unit 232.

In this embodiment, the controller may control operations of the front notification unit 255 and the rear notification unit 256 based on a placed (oriented) status of the terminal body.

In more detail, referring to FIG. 2A, when an event is generated in the terminal in a status that the main body is oriented (placed) with the rear surface up (hereinafter, referred to as a second status), the rear notification unit 256 may operate. The event may be, for example, a message reception, a call reception, a missed call, a schedule notification, an email reception, an information reception using an application, or the like.

For example, when a message is received in the second status, the rear notification unit 256 may be flickering. The flickering of the rear notification unit 256, as illustrated, may repeat the same pattern by a preset period. While the rear notification unit 256 is flickering, the display module 251 may remain deactivated.

Here, when the terminal is turned over and changed into a status that the main body is placed with the front surface up (hereinafter, referred to as a first status), the front notification unit 255 may operate. The operation of the front notification unit 255 may have the same period and pattern as the flickering of the rear notification unit 256. The operation of the front notification unit 255 in the first status may also be applied when an event is generated in the terminal in the first status.

However, the present invention may not be limited to this. For example, the front and rear notification units may have different flickering periods and patterns. Specifically, when the rear notification unit generates light of a single color, it may match various patterns with generated events to notify a user of what kind of event has been generated.

As such, with controlling the operations of the front notification unit 255 and the rear notification unit 256, the terminal may notify the user of information irrespective of statuses.

Figure 3A:
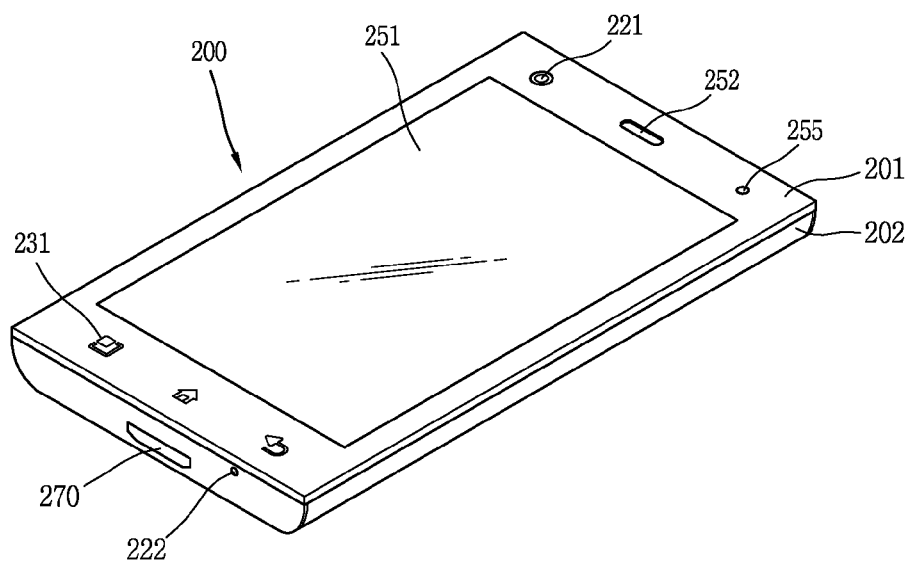
FIG. 3A is a front perspective view of an example of a mobile terminal in accordance with the present invention.
Figure 3B:
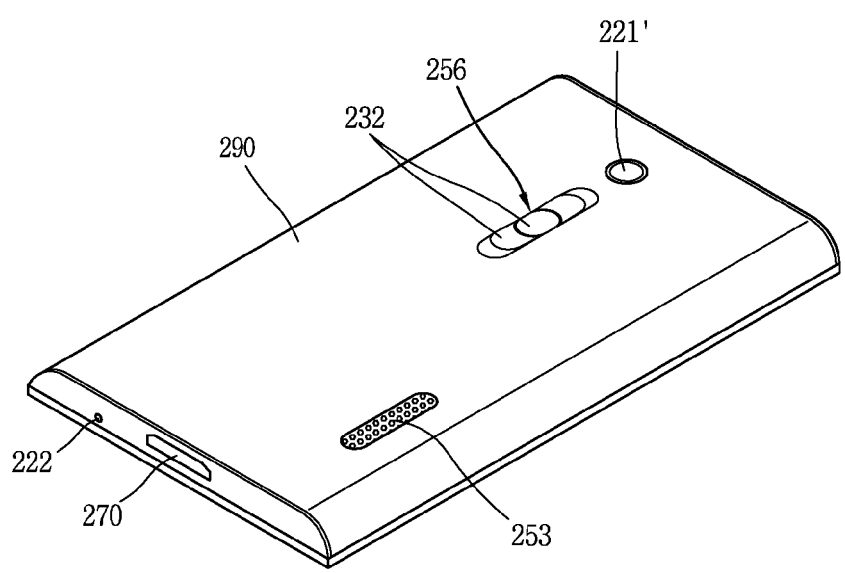
FIG. 3B is a rear perspective view of the mobile terminal illustrated in FIG. 3A.

Hereinafter, hardware configuration of the terminal executing the operations illustrated in FIGS. 2A and 2B will be described in more detail. FIG. 3A is a front perspective view of an example of a mobile terminal in accordance with the present invention, and FIG. 3B is a rear perspective view of the mobile terminal illustrated in FIG. 3A.

A mobile terminal 200 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner.

A body may include a case (or referred to as casing, housing, cover, etc.) defining an appearance of the mobile terminal 200. In this embodiment, the case may be divided into a front case 201 and a rear case 202. A space formed between the front and rear cases 201 and 202 may accommodate various electronic components. At least one intermediate case may further be disposed between the front and rear cases 201 and 202.

Such cases may be injected using a synthetic resin or be formed of a metal, such as stainless steel (STS), titanium (Ti) or the like.

The terminal body is shown having a display module 251, an audio output module 252, a camera 221 and the like provided on the front case 201. Also, an interface unit 270, and the like may be disposed on side surfaces of the front case 201 and the rear case 202.

The display module 251 may occupy most of a principal surface of the front case 201. That is, the display module 251 may be disposed on a front surface of the terminal and display visual information. The audio output module 252 and the camera 221 may be disposed near one of both end portions of the display module 251, and a front input unit 231 and the microphone 222 may be disposed near the other end portion of the display module 251.

The front input unit 231 is one example of the user input unit 130 (see FIG. 1) and may include a plurality of manipulation units. The manipulation units may be commonly designated as a manipulating portion, and employ any method if it is implemented in a tactile manner allowing the user to perform manipulation with a tactile feeling. In this embodiment, the front input unit 231 may be implemented as a touch key. However, the present invention may not be limited to this. The front input unit 231 may include a push key.

Also, the display module 251 may form a touch screen together with a touch sensor. In this structure, the touch screen may serve as a user input unit. Accordingly, the front surface of the mobile terminal may be implemented in a form factor that a push key is not disposed below the touch screen. Here, the mobile terminal may be configured to an input manipulation with respect to the terminal main body may be allowed only through the display module 251 and a rear input unit 232 to be explained later.

Referring to FIG. 3B, a rear surface of the terminal body, namely, the rear case 202 is shown further having a camera module 221'. The camera module 221' faces a direction which is opposite to a direction faced by the camera 221 (see FIG. 3A), and may have different pixels from those of the camera 221.

For example, the camera 221 may operate with relatively lower pixels (lower resolution). Thus, the camera 121 may be useful when a user can capture his face and send it to another party during a video call or the like. On the other hand, the camera 221' may operate with a relatively higher pixels (higher resolution) such that it can be useful for a user to obtain higher quality pictures for later use. The cameras 221 and 221' may be installed in the terminal body to be rotatable or popped up.

A flash and a mirror may additionally be disposed adjacent to the camera 221'. The flash operates in conjunction with the camera 221' when taking a picture using the camera 221'. The mirror can cooperate with the camera 221' to allow a user to photograph himself in a self-portrait mode.

An audio output module 253 may further be disposed at a rear face of the terminal body. The rear audio output module can cooperate with the audio output module 252 (see FIG. 3A) to provide stereo output. Also, the audio output module 252' may be configured to operate as a speakerphone.

That is, in addition to the audio output module 252 (first audio output module) on the front surface of the terminal, implemented as a receiver, the second audio output module 253 may be formed on the rear surface and implemented as a speaker. Without being limited to the structure, the second audio output module 253 may be disposed on a side surface of the terminal.

A power supply unit 290 for supplying power to the mobile terminal 200 may be mounted in the terminal body. The power supply unit 290 may be mounted in the terminal body or detachably coupled directly onto the outside of the terminal body.

As shown in the drawings, the rear input unit 232 may be disposed on the rear face of the terminal body. The rear input unit 232, for example, may be located below the camera module 221'.

The rear input unit 232 may be manipulated by a user to input a command for controlling an operation of the mobile terminal 200, and set to allow inputting of various contents. For example, the rear input unit 232 may allow a user to input commands, such as power on or off, START, END, SCROLL or the like, volume adjustment of sounds output from the audio output module 252, or conversion of the display module 210 into a touch recognition mode, or the like.

The rear input unit 232 according to the present invention may be configured to receive an input in a pushing manner. Hereinafter, the configuration of the rear input unit 232 will be described in more detail.

Figure 4A:
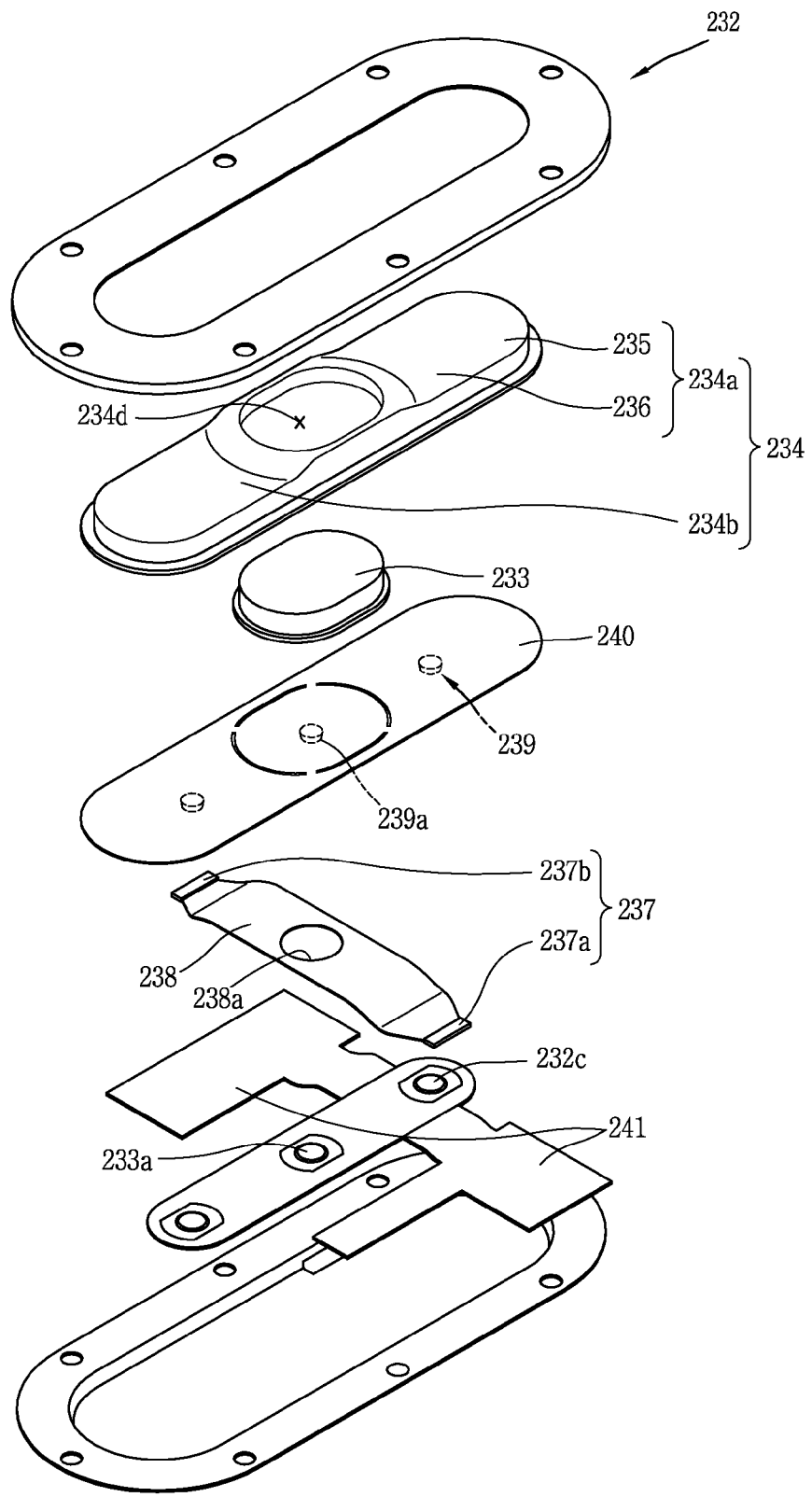
FIGS. 4A and 4B are a detailed disassembled view and a sectional view respectively illustrating one embodiment of a rear input unit according to the present invention.
Figure 4B:
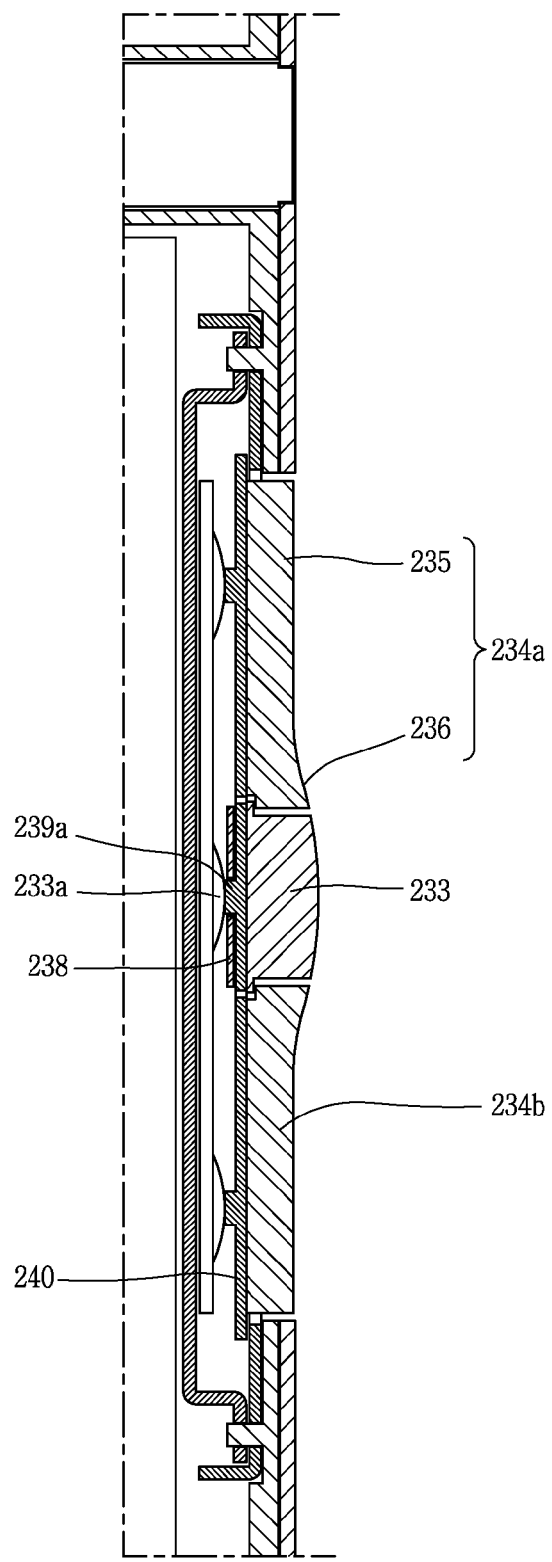

FIGS. 4A and 4B are a detailed disassembled view and a sectional view respectively illustrating one embodiment of a rear input unit according to the present invention.

As illustrated in FIGS. 4A and 4B, the first and second buttons 233 and 234 may be configured such that the first button 233 protrudes more than the second button 234. Further, each of keys 234a and 234b of the second button 234 may include a flat portion 235 and an inclined portion 236.

The flat portion 235 may be in parallel to the rear surface of the terminal body. The second button 234 may include a through hole 234d for accommodating the first button 233 such that the first button 233 can be located between the keys 234a and 234b. The inclined portion 236 may be inclined from the flat portion 235 toward the through hole 234d. Here, the first button 233 may protrude from the flat portion 235 to be distinguishable from the keys 234a and 234b. To allow the first button 233 and the keys 234a and 234b to be smoothly connected at borders therebetween, the inclined portion 236 may be inclined from the flat portion 235 in the protruding direction. With such structure, as illustrated, even if the first button 233 is partially protruding from the rear surface of the terminal body, the inclined portion 236 may present the first button 233 from being pushed when the rear surface of the terminal body comes in contact with an external object.

The rear input unit 232 may be configured to emit light to the exterior. In more detail, the rear input unit 232 may include switches 232c, a light source 237 and a light guide 238.

The switches 232c may be provided in plurality to correspond to the first and second buttons 233 and 234 and arranged in a row. The switches 232c may be mounted onto a flexible printed circuit board 241, and implemented as a dome switch, a piezoelectric switch or the like, for example.

The light source 237 may be disposed adjacent to the switches 232c, and implemented as a light emitting diode (LED) or the like. For example, the light source 237 may include first and second light sources 237a and 237b arranged on both sides based on the row of the switches 232c. In more detail, the first and second light sources 237a and 237b may be disposed on both sides of the switch 233a, which corresponds to the first button 233, of the switches 232c.

The light guide 238 may be configured to cover at least part of the switches 232c, and connected to the light source 237 to emit light of the light source 237. For example, the first and second light sources 237a and 237b may be connected to both ends of the light guide 238. The light guide 238 may be disposed in an intersecting direction with the row of the switches 232c to cover the switch 233a corresponding to the first button 233.

Here, the first button 233 may be made of a transparent material so as to transmit light generated from the light source 237 to the exterior. In addition, the second button 234 may be made of an opaque material to prevent leakage of the light.

As illustrated, a member 240 having protrusions 239 protruding toward the switches 232c may be disposed below the first button 233 and the second button 234. The member 240 may be made of a transparent material for allowing light transmission. The member 240 may have one surface connected with the first button 233 and the second button 234 and another surface having the protrusions 239 corresponding to the switches 232c. Here, a slit may be formed around a protrusion 239a corresponding to the first button 233. Also, a through hole 238a through which the protrusion 239a corresponding to the first button 233 is inserted may be formed on the light guide 238. According to the structure, a force that the first button 233 is pushed may be more efficiently transferred to the switch.

The control operations involved with the rear input unit and the rear notification unit both of which allow for the push input, which have been illustrated in FIGS. 2A and 2B, may be varied into various forms as illustrated in FIGS. 5 to 14. Hereinafter, for the sake of brief description with reference to the drawings, the same or equivalent components will be provided with the same or equivalent reference numbers, and description thereof will not be repeated.

FIG. 5 is a table illustrating an example of controlling front and rear notification units according to a placed status of the terminal. Referring to the table illustrated in FIG. 5, operations of the front and rear notification units may differ according to whether the terminal is placed (oriented) in a first status, a second status or a third status.

The first and second statuses, as aforementioned, refer to the status that the terminal is placed with its front surface up and the status that the terminal is placed with its rear surface up, respectively. On the contrary, the third status refers to a status that the terminal body is inclined. That is, the third status is a status that a user holds the terminal with their hand. This status may not be horizontal to the ground, a table, a floor and the like.

The determination of the first to third statuses may be realized by a combination of at least two of a proximity sensor, a light sensor and a gyro sensor. For example, the first and second statuses may be determined using luminance of the light sensor, and the third status may be determined using the gyro sensor and the light sensor. Further, the controller of the terminal may control the operations of the front and rear notification units when the output of the light sensor and the output of the gyro sensor meet preset conditions.

According to the table, in the first status, the front notification unit may operate (be activated) upon generation of events in the terminal, such as charging, power on or power off, an LCD awake key pressed, an incoming call, a missed notification, and the like.

In the second status, the rear notification unit may operate (be activated) upon generation of events in the terminal, such as charging, an alarm, an incoming call, a missed notification, and the like. Here, the front notification unit and the rear notification unit may not operate upon the generation of the events, such as the power on or power off of the terminal, the LCD awake key pressed, and the like.

In the third status, the front notification unit may operate upon generation of events, such as the terminal charging, the power on or power off of the terminal, the LCD awake key pressed, the alarm, the missed notification and the like, but both the front notification unit and the rear notification unit may operate for the incoming call. As such, as the rear notification unit operates in response to the incoming call, other users (persons) may recognize that the user is on the phone.

Also, embodiments of the present invention provide a variety of user convenience using the rear notification unit or the rear input unit. Related examples will be described in more detail in embodiments to be explained hereinafter. Here, the following embodiments may be executed regardless of the operation or non-operation of the notification units according to the terminal-placed statuses.

Next, FIGS. 6 to 11 are conceptual views illustrating different examples of operations realized in the terminal of FIG. 3B. According to an operation illustrated in FIG. 6A, when the user turns the terminal over to the front surface after confirming the notification of an event generation on the rear surface, the user may be aware of a type of event based on a color even if the display module 251 is in deactivated state.

First of all, in the second status, the rear notification unit 256 may operate when an event is generated, and the user can be aware of the event generation in response to the operation of the rear notification unit 256. After the rear notification unit 256 operates, when the user turns the terminal over to switch the second status into the first status, the front notification unit 255 can operate.

Here, the front notification unit 255 can selectively output light of a plurality of colors, and the display module 251 can be maintained in the deactivated state. This figure illustrates that a home button is provided on the front surface and the front notification unit 255 is disposed on in the home button. However, the present invention is not limited to this, and the front notification unit 255 may be separately provided.

In more detail, the front notification unit 255 can output the light by selecting one of the plurality of colors. Which color of light is to be output may depend on an event generated (or an application from which an event has been generated). For example, an output of green light can be set to a message reception (Case A) and an output of red light can be set to a missed call (Case B).

Therefore, even in the deactivated state of the display module 251, the user can recognize from which application an event has been generated (an event-generated application).

Figure 6A:
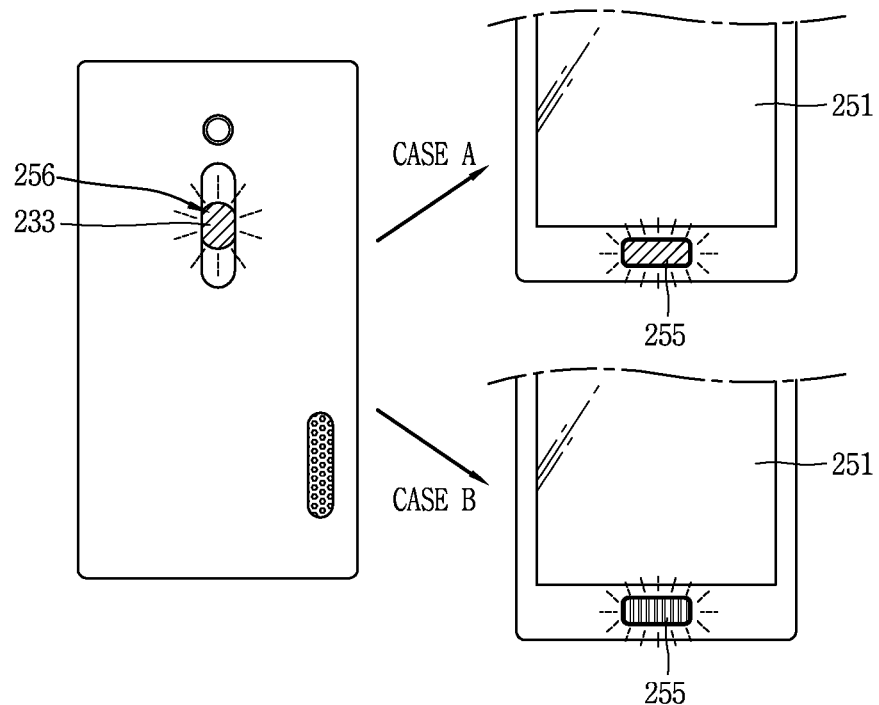
FIGS. 6A to 11 are conceptual views exemplarily illustrating different operations implemented in the terminal of FIG. 3B.
Figure 6B:
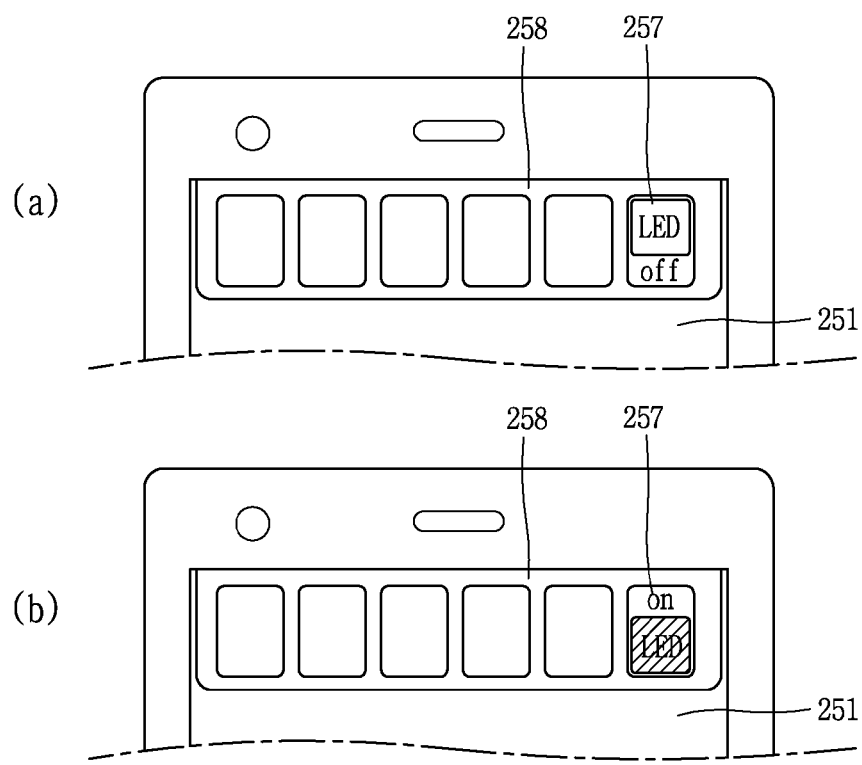

Referring to FIG. 6B, an ON/OFF icon 257 of the front notification unit 255 may be provided on a quick setting menu 258 such that the front notification unit 255 or the rear notification unit 256 can be easily turned on or off and the color can match a type of application. For example, when the ON/OFF icon 257 of the quick setting menu 258 is touched by the user in the power-off state of the front notification unit 255, the front notification unit 255 may be powered on. Here, a color setting window can be output in response to the power-on of the front notification unit 255. Accordingly, the user can set a color corresponding to an application.

The setting of the color may be varied using various methods. For example, a color may be recommended on the color setting window according to a word or tag, or a color may be set by using database documents obtained by analyzing user's usage patterns.

Figure 7A:
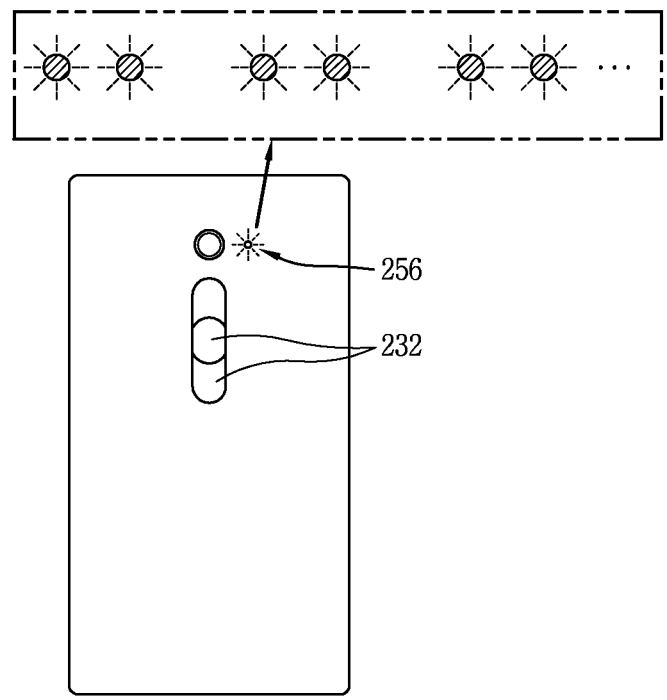
Figure 7B:
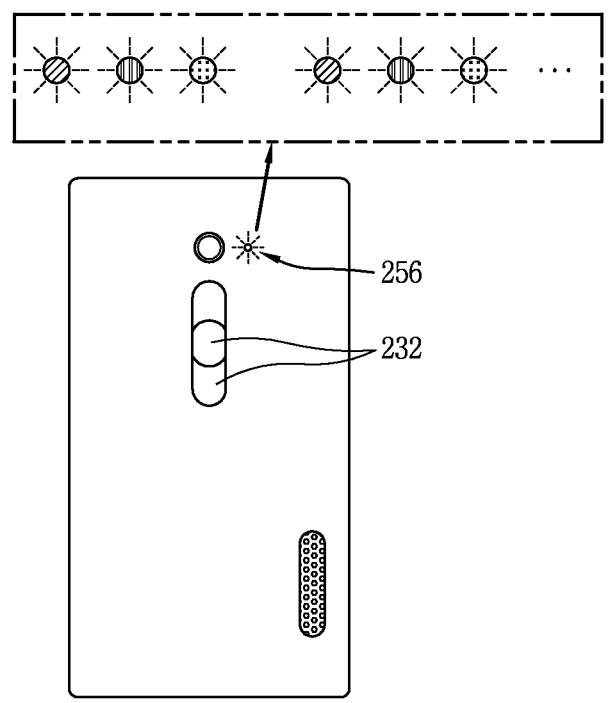

According to operations illustrated in FIGS. 7A and 7B, the terminal can inform the user of the number of events generated in the second status. Here, this embodiment illustrates an example that the rear notification unit 256 and the rear input unit 232 are provided separate from each other, but may be applicable to another example that the rear input unit 232 serves as the rear notification unit 256 as well.

In more detail, when N events are generated in the second status, the rear notification unit 256 may be flickering N times and then powered off for a preset time. That is, the N-time flickering may be performed periodically, and accordingly, the rear notification unit 256 may be flickering to notify the generation of the plurality of events. In addition, the power-off time may be set by the user, and the flickering may be performed periodically by the number of times corresponding to the number of the events generated.

Referring to FIG. 7A, the rear notification unit 256 may output light of a single color. Here, when two events are generated (for example, a missed call, and an information reception via an application are generated), the rear notification unit 256 may repeat an operation of flickering two times and then flickering two more times after 3 seconds.

The example illustrated in FIG. 7A may also be applied to the front notification unit 255. For example, when N events are generated in the first or third status, the front notification unit 255 may flicker N times and then powered off for a preset time. This may allow the user to easily recognize the number of events generated.

As another example, the number of events may be notified by a flickering interval. In detail, when N events are generated, the rear notification unit may periodically repeat an operation of being powered on for N seconds and powered off for a preset time.

When the rear notification unit 256 or the front notification unit 255 can output light of a plurality of colors, types of applications corresponding to events may be notified. Referring to FIG. 7B, when N events are generated, the rear notification unit 256 may output light of a different color per one time, and be powered off for a preset time. In more detail, when events including a missed call, a message reception, and an information reception via an application are sequentially generated, the rear notification unit 256 may output light of colors corresponding to the events in a sequential manner.

As another example, when the rear notification unit 256 or the front notification unit 255 can output light of a plurality of colors, information relating to another party (or callee) involved with an event may be notified. In more detail, when an event such as a message that a performing subject is another party is generated, the rear notification unit 256 or the front notification unit 255 can output light by changing a color according to a kind of another party. For example, red light can be output when a message is received from a president of a company, and blue light can be output when a message is received from a friend. This allows the user to recognize another party of the event in the second status (or the first or third status).

Also, when a message or a call signal is received from a spam-registered number, a red light may be output to notify information to the user. As another example, even when N events are generated, a color of an event generated with the highest priority can be only output. The event generated with the highest priority, for example, may be the latest event, an event of an application with the high use frequency of the user, an event that the user has set as the priority, and the like.

Figure 8:
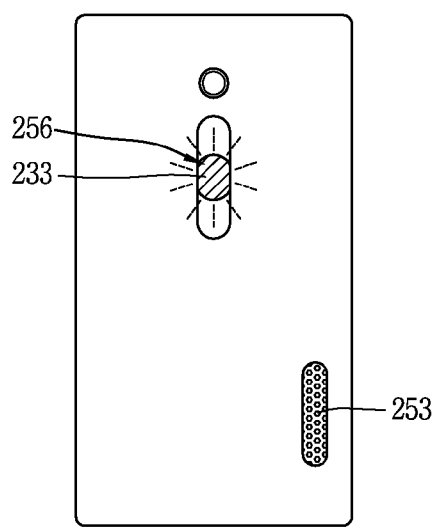
Figure 8:
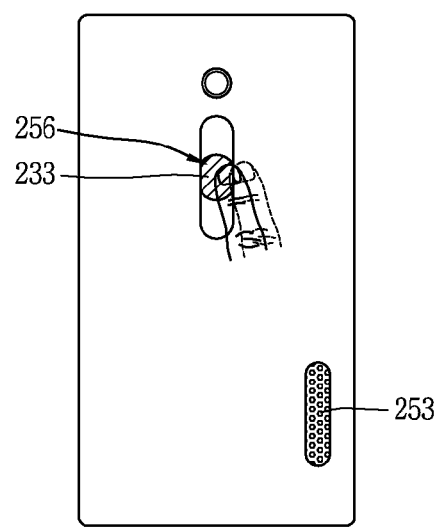
Figure 8:
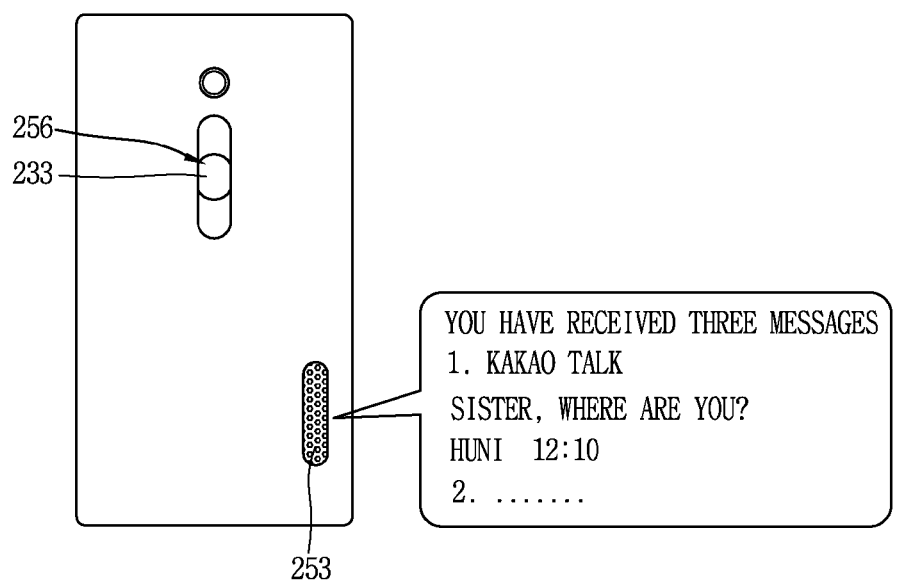

Next, according to an operation illustrated in FIG. 8, the terminal can execute an unlocking operation using the rear notification unit 256. For example, when the first button 233 is pushed to correspond to an unlocking pattern in a locked state of the terminal, the terminal can be switched into the unlocked state. The locked state refers to a state that an input of a control command is not allowed except for some buttons of the terminal. Alternatively, the locked state refers to a state that at least part of components of the terminal is not operating. Further, in the locked state, a touch input onto the display module may be restricted.

In more detail, when the terminal is in the second status that the terminal body is placed with the rear surface up and is in the locked state, upon generation of an event, referring to FIG. 8(a), the rear notification unit 256 may first operate. Here, referring to FIG. 8(b), an unlocking operation can be performed when the first button 233 on the rear surface is pushed to correspond to the unlocking pattern, and the terminal can be switched into the unlocked state.

The unlocking pattern may be set by a combination of push and release actions with respect to the button. For example, the unlocking operation may be performed by various patterns, such as a pattern of pushing the first button 233 continuously four times, or another pattern of pushing the first button 233 one time and pushing two more times after 1 second.

Referring to FIG. 8©, when the terminal has been switched into the unlocked state, information relating to the event may be output in form of sound. Here, when the event-related information is text, the text may be output into the form of sound by text to speech (TTS).

As such, when there is a user-missed event, the terminal may be unlocked and inform in more detail the information notified by the rear notification unit 256 in the form of sound. The output of the sound may be executed through the second audio output module 253. The mobile terminal also remains in the second state and the user doesn't have to flip the phone over the first state to determine detailed information about an incoming event.

As one example, when a message is received through a messenger application, at least one of the application name, details of the message, another party-related information, and an event generation time may be output in the form of sound. Further, the information output by the sound or an output level of the sound may be set by the user.

Figure 9:
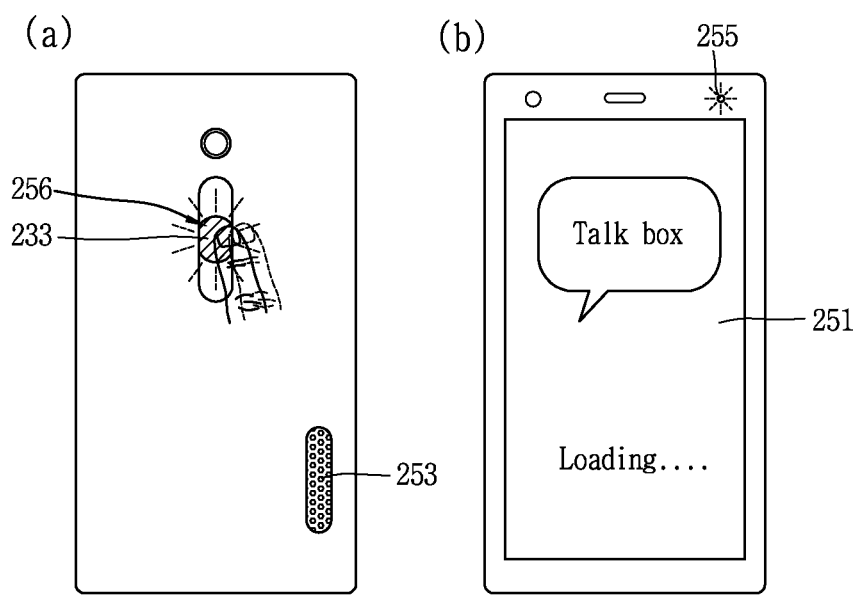

Next, FIG. 9 illustrates an operation of the terminal when the terminal is switched into the first status after being unlocked. Referring to FIG. 9(a), when the terminal is in the second status with the rear surface up and is in the locked state, upon generation of an event, the rear notification unit 256 may operate. Here, the unlocking may be performed when the first button 233 on the rear surface is pushed to correspond to an unlocking pattern, and the terminal is switched into the unlocked state.

Referring to FIG. 9(b), after being unlocked in the second status, when the terminal is turned over to the first status, an application from which the event has been generated may be executed. For example, when the terminal is switched into the first status, an execution screen of the application can be output on the display module. In addition, the front notification unit 255 can also operate. FIG. 9(b) illustrates that the front notification unit 255 is provided on an upper end of the display module and any button is not disposed on the front surface.

As another example, when the terminal body is switched into the second status while sound is output, a different function may be executed according to whether or not the button is pressed upon the status switching. In more detail, when there is one message, if unlocking is performed using the first button 233 on the rear surface, the corresponding message may be read through the TTS. When the terminal is turned over while reading the message, a direct entrance into the corresponding application may be available.

When there are several messages, if the unlocking is performed using the first button 233 on the rear surface, another embodiment may be realized. For example, when the terminal is turned over with pushing the first button 233 while the message is read through the TTS, the terminal may enter the corresponding application. When the terminal is turned over without pushing the first button 233, a home screen page may be output on the display module.

In addition, the home screen page may also be represented as an idle screen, and the display module may be touch-inputtable on the entire area. In this instance, the first button 233 may be a hot key for unlocking. In more detail, the home screen page can display icons of applications installed in the mobile terminal and a widget, and also be provided in plurality according to a user's selection or the number of applications installed in the terminal.

As such, the switching into the home screen page may be implemented by restoring an executed state of a predetermined application, other than a lock mode, into the home screen page. For example, when a webpage is output on the display module 251, and when the first button 233 is pushed, the home screen page may be restored. That is, the first button 233 can operate as a home key which performs a control command for return to the home screen page.

Figure 10:
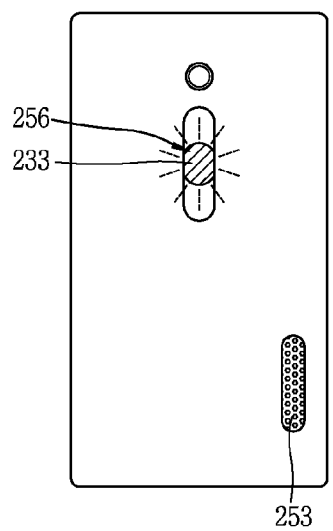
Figure 10:
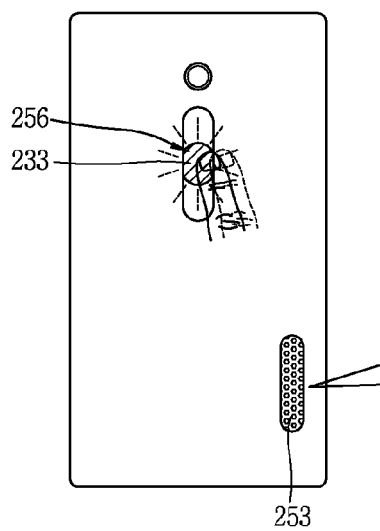
Figure 10:
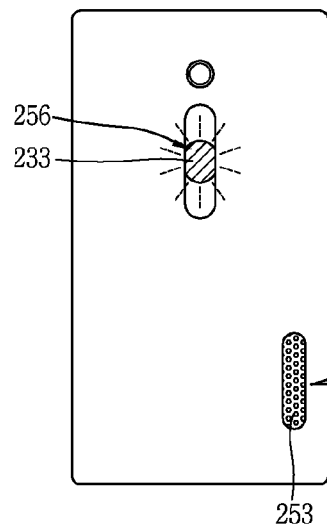

Referring to FIG. 10, one embodiment of the present invention allows for an operation of executing a predetermined application in the second status without viewing a screen. For example, when the terminal is in the second status and is in a locked state, upon generation of an event, referring to FIG. 10(a), the rear notification unit 256 may first operate. Unlocking may be performed when the first button 233 on the rear surface is pushed to correspond to an unlocking pattern, and the terminal can be switched into the unlocked state.

Referring to FIG. 10(b), when the terminal is switched into the unlocked state, information relating to the event can be output in form of sound. That is, when there is a user-missed event, the terminal can be unlocked and inform in more detail the information notified by the rear notification unit 256 in the form of the sound. Also, the output of the sound can be executed through the second audio output module 253. When the user-missed event includes text such as a message, the text may be converted into sound by the TTS.

Further, while the sound is output, and when the first button 233 is pushed into a predetermined pattern, the terminal can be switched into a predetermined mode (see FIG. 10(c)). The predetermined mode may be a mode of receiving a feedback for the audio or sound which is entered using an input with respect to the button while the sound is output, for example, a reply mode.

When the button is pushed after entrance into the reply mode, voice recognition or recording may be performed, which may facilitate the reply operation. Also, the rear notification unit 256 may operate while receiving the feedback. For example, the rear notification unit 256 may be flickering during the voice recognition or recording.

This embodiment illustrates that the light flickering may be realized into a different pattern from the light flickering illustrated in FIGS. 2A and 2B. For example, a pattern that one-time flickering is performed using quick or fast turned on lights and slow turned off lights may be implemented.

Figure 11:
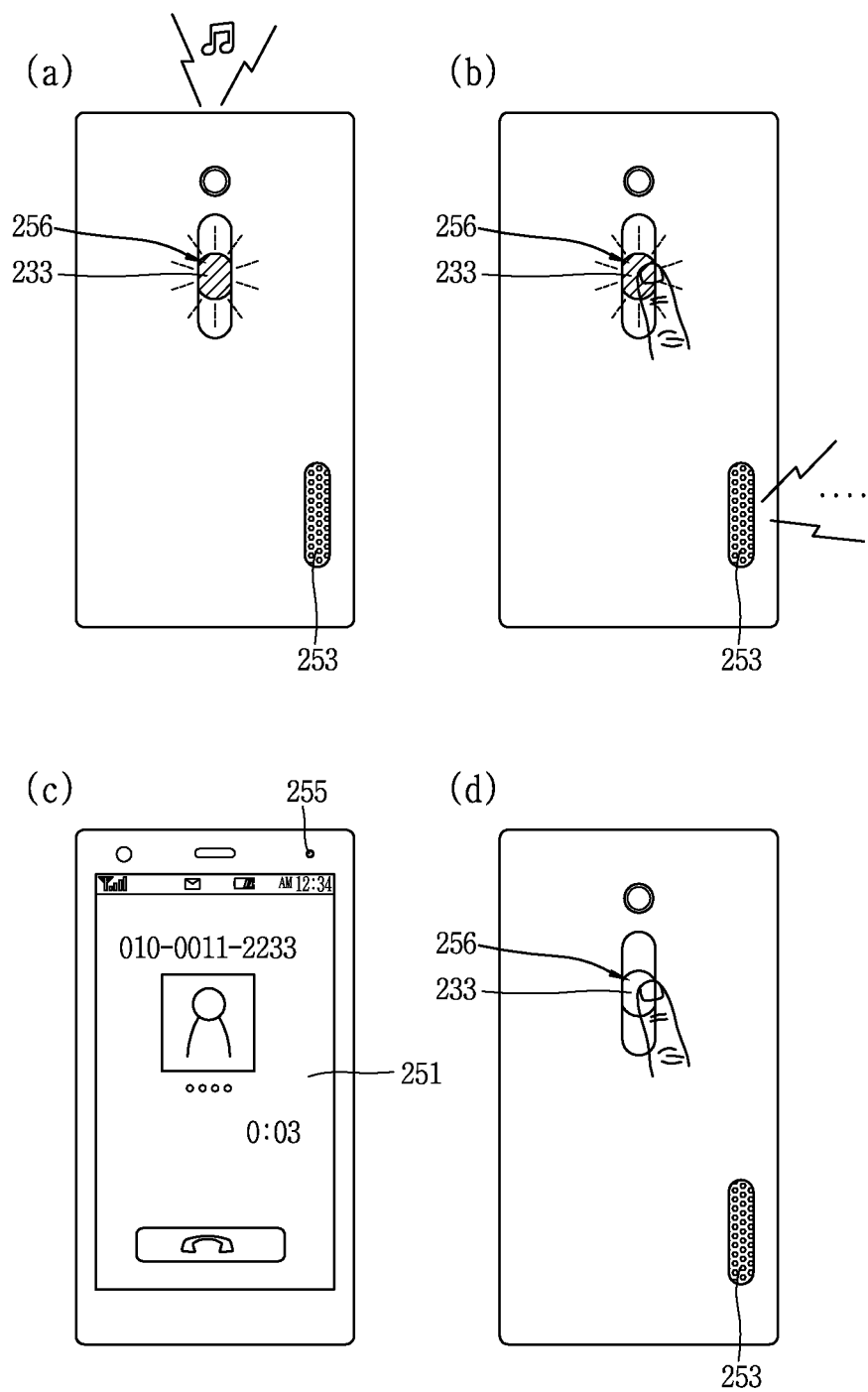

Next, FIG. 11 illustrates that an incoming call is generated in the second status. As illustrated in FIG. 11, when an incoming call is generated in the second status, a speakerphone mode is automatically executed, which may improve user convenience.

For example, referring to FIG. 11(a), when a call signal is received, the rear notification unit 256 may operate to emit light (flickering). Referring to FIG. 11(b), when the user pushes the button 233 of the rear input unit 232, the call may be connected and a speakerphone mode may be executed. Therefore, a voice of another party can be output through the second audio output module 253.

In addition, referring to FIG. 11(*c*), when the user turns the terminal over into the first status, or when the user holds the terminal in the third status, the display module 251 can be activated and the speakerphone deactivated. Further, the voice of the other party can be output through the first audio output module 252.

As another example, the rear notification unit 256 may be continuously operating during a call connected in the second status. Referring to FIG. 11(*d*), when the button 233 of the rear input unit 232 is pushed while the call is connected, the operation of the rear notification unit 256 may be stopped. In this instance, the display module 251 on the front surface may be activated. In addition, when the button 233 of the rear input unit is pushed again, the rear notification unit 256 may operate and the display module 251 may be deactivated.

Figure 12:
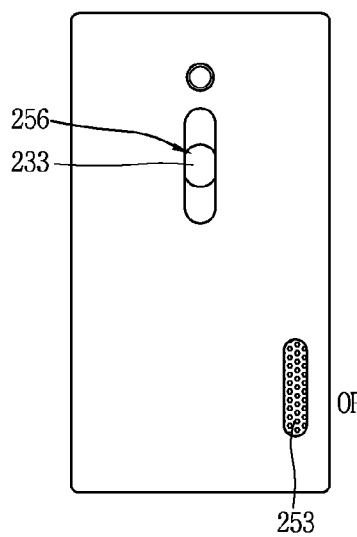
FIGS. 12 to 14 are conceptual views illustrating variations of the present invention.
Figure 12:
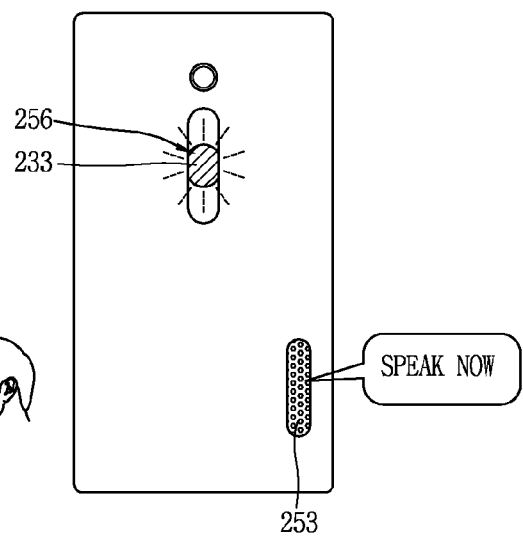
Figure 12:
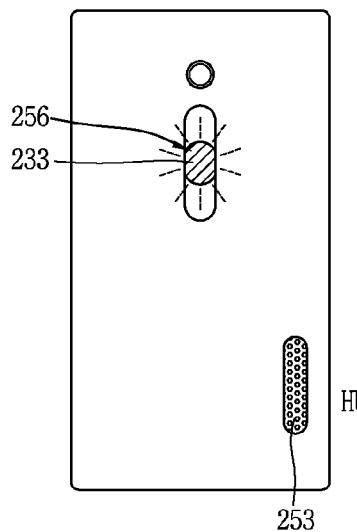
Figure 12:
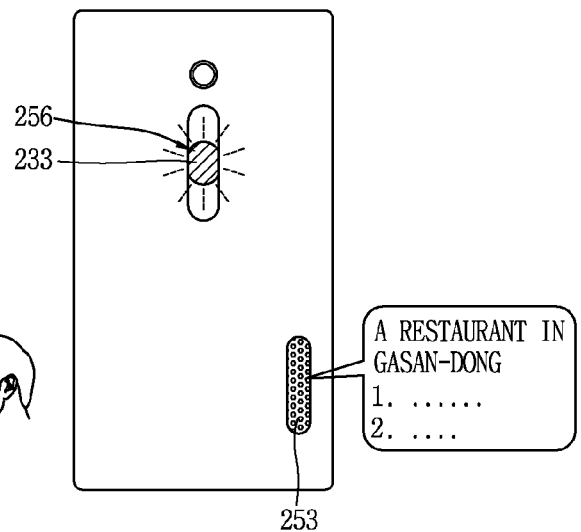

Hereinafter, variations of the present invention will be described with reference to FIGS. 12 to 14. Referring to FIG. 12, the terminal may immediately execute a predetermined application in the first status. As one example, the terminal may receive an application execution command in the second status through voice recognition.

Referring to FIG. 12(*a*), a voice recognition function may be activated in the second status. When a user speaks art application execution command, referring to FIG. 12(*b*), the application may be executed. However, the present invention is not limited to the second status. Even when the user speaks the application execution screen during charging, for example, the application may be executed.

The application execution command, for example, may be an application name, a brand name, a predetermined name, an abbreviation and the like. This embodiment illustrates that an intelligent voice recognition solution (application) is executed when the user speaks "Optimus."

The intelligent voice recognition is a technology of operating a smart phone or the like in response to a voice when two hands are not free due to driving, cooking, exercising and the like, and refers to a function that a product understands (comprehends) what the user is speaking so as to react and automatically handle (deal with, respond to) the user's speaking.

Referring to FIG. 12(*c*), when the user speaks "Hungry," the intelligent voice recognition solution can inform the user of restaurants nearby as shown in FIG. 12(*d*). In this instance, the rear notification unit 256 may operate as soon as the intelligent voice recognition solution being executed. Accordingly, the user can recognize the start of the solution function even in the second status.

Figure 13:
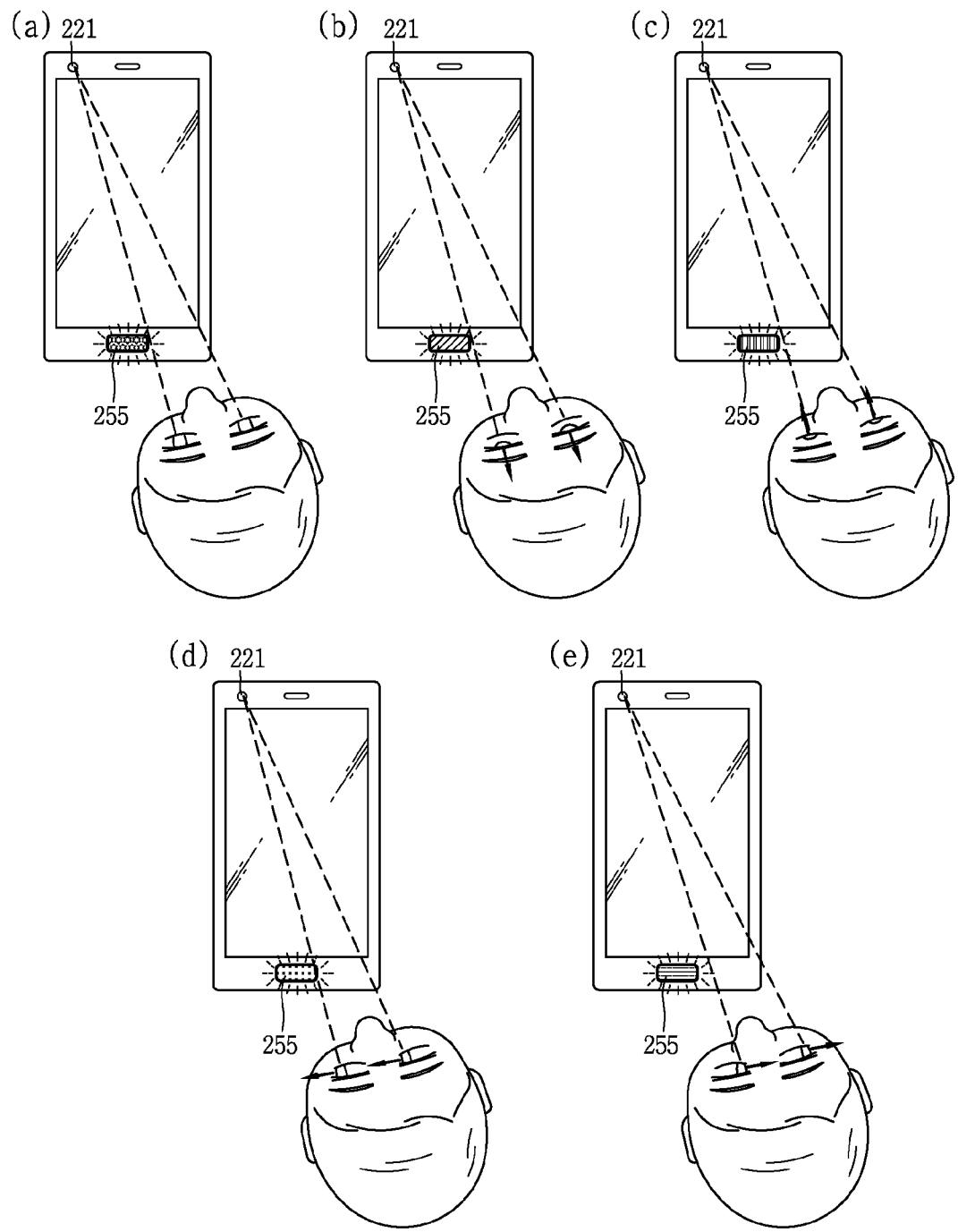

Next, FIG. 13 illustrates an example that the front notification unit 255 operates when the pupils of the user's eyes are recognized by a camera. A camera for recognizing the user's pupils may be disposed on the front surface of the terminal. When the event is generated during recognition of the pupils, the front notification unit may operate.

Referring to FIG. 13(*a*), when an event is generated while the pupils of the eyes are recognized, the front notification unit 255 may operate. As the front notification unit 255 is flickering while the pupils are recognized, a feedback that the pupil recognition is correctly executed may be provided to the user.

Here, the front notification unit 255 may output light of a different color along a moving direction of the pupils. As one example, green light can be output when the pupils move upwardly (see FIG. 13(*b*)), red light may be output when pupils move downwardly (see FIG. 13(*c*)), blue light may be output when the pupils move to a left-hand side (see FIG. 13(*d*)), and violet light may be output when the pupils move to a right-hand side (see FIG. 13(*e*)). A different color may be output when no movement of the pupils is recognized.

As different colors of light are provided according to the up/down/left/right directions when an interaction is realized by the gesture of the pupils, to which side the pupils are moving can be accurately recognized.

Figure 14:
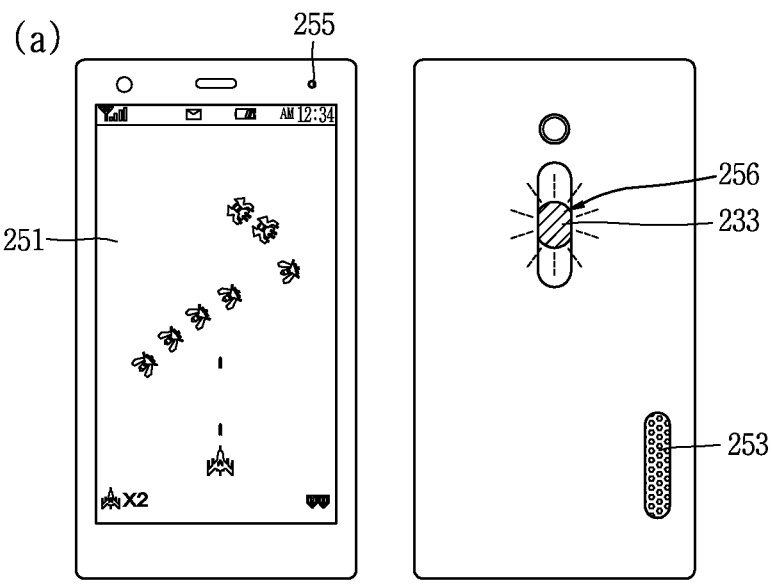
Figure 14:
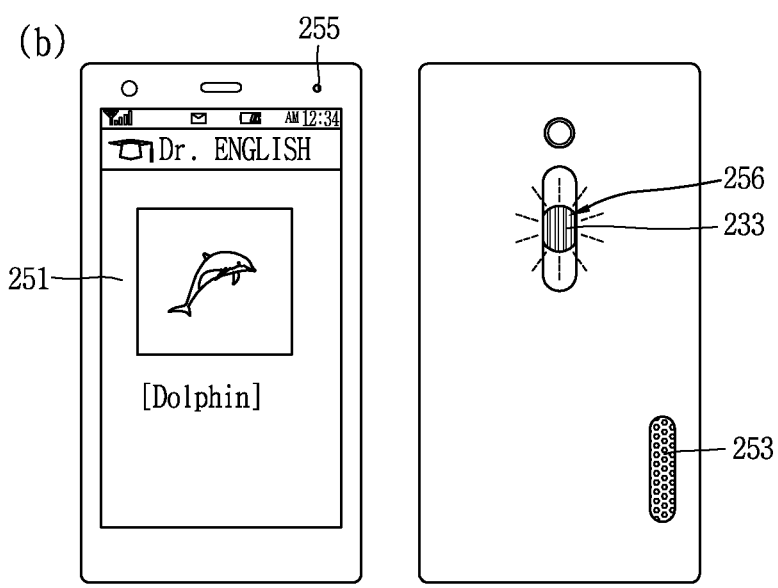

Next, FIG. 14 illustrates an example that the rear notification unit notifies information related to a currently-executed application in the terminal. In more detail, the rear notification unit 256 can output light by selecting one of a plurality of colors. What color of light is to be output among the plurality of colors may depend on the information related to the currently-executed application.

For example, referring to FIG. 14(*a*), green light can be output while a game-related application is executed. Referring to FIG. 14(*b*), red light can be output while an education-related application is executed. This allows another user to recognize, through the rear surface of the terminal, which application is executed by the user.

As another example, the flickering speed of the rear notification unit 256 may be controlled in cooperation with a speed of a touch input applied onto the display module 251. For example, while a game-related application is executed, when the touch speed is fast, the rear notification unit 256 may be fast flickering. In this instance, the darkness of a color may change. If a score within the game application increases, the color of light emitted from the rear notification unit 256 may cooperatively change from a light green color into a dark green color. According to the example, another user who shares the game may recognize that the user is playing the game well.

The present invention can notify information to a user irrespective of a status of a terminal by controlling operations of a front notification unit and a rear notification unit using a placed status of the terminal. Also, with simultaneous use of the front notification unit and the rear notification unit, information related to an event generated even in a deactivated state of a display module may be provided in various Manners.

Also, with a user input unit disposed on a rear surface of the terminal, a front display can be formed with a large screen. Also, a new type of user interface of unlocking the terminal using the rear user input unit may be implemented.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal body having a front surface and a rear surface;

a front notification unit and a rear notification unit formed on the front surface and the rear surface, respectively, and configured to notify events generated in the mobile terminal using light emitted from light sources;

a display module formed on the front surface together with the front notification unit; and a controller configured to selectively operate the front notification unit and the rear notification unit according to a placed status of the terminal body.

2. The mobile terminal of claim 1, wherein the placed status of the terminal body includes a first status in which the terminal body is placed with the front surface up, and a second status in which the terminal body is placed with the rear surface up.

3. The mobile terminal of claim 2, wherein the controller is further configured to operate at least one of the front notification unit and the rear notification unit during an incoming call in a third status in which the terminal body is inclined.

4. The mobile terminal of claim 3, further comprising:

a user input unit having at least one button disposed on the rear surface and configured to sense an input of a control command, wherein the controller is further configured to stop the operation of the rear notification unit when the button is pushed during the incoming call in the third status.

5. The mobile terminal of claim 2, wherein the controller is further configured to:

operate the rear notification unit when the event is generated in the second status, and operate the front notification unit when the terminal body is switched into the first status after the rear notification unit is operated.

6. The mobile terminal of claim 5, wherein the controller is further configured to selectively output light of a plurality of colors of the front notification unit when the terminal body is switched into the first status after the rear notification unit is operated, and wherein the color of the light output is selected according to an application from which the event has been generated.

7. The mobile terminal of claim 2, further comprising:

a first audio output module disposed on the front surface; and a second audio output module disposed on at least one of the rear surface and a side surface of the terminal, wherein the controller is further configured to operate the second audio output module when an incoming call is generated in the second status.

8. The mobile terminal of claim 7, wherein the controller is further configured to:

activate the display module, stop the operation of the second audio output module and operate the first audio output module when the second status is switched into a third status in which the terminal body is inclined.

9. The mobile terminal of claim 1, wherein controller is further configured to control the rear notification unit to flicker light to notify generation of a plurality of events on the mobile terminal.

10. The mobile terminal of claim 9, wherein the controller is further configured to periodically flicker light based on a number of the plurality of events.

11. The mobile terminal of claim 1, further comprising:

a user input unit disposed on the rear surface and having at least one button configured to sense an input of a control command, wherein the rear notification unit is provided on the user input unit.

12. The mobile terminal of claim 11, wherein the controller is further configured to switch the mobile terminal into an unlocked state when the button is pushed in an unlocking pattern in a locked state of the terminal.

13. The mobile terminal of claim 12, wherein the unlocking pattern is set by a combination of push and release actions with respect to the button.

14. The mobile terminal of claim 12, wherein the controller is further configured to output audio or sound information related to the event when the terminal is switched into the unlocked state in response to the button being pushed in the second status.

15. The mobile terminal of claim 14, wherein the controller is further configured to execute an event-generated application in response to the switching into the first status while outputting the audio or sound information.

16. The mobile terminal of claim 14, wherein the controller is further configured to perform a different function according to whether or not the button is pushed upon switching the status into the first status while outputting the audio or sound information.

17. The mobile terminal of claim 14, wherein the controller is further configured to enter the mobile into a mode of receiving a feedback for the output audio or sound information based on input onto the button.

18. The mobile terminal of claim 1, wherein an application execution command is received through voice recognition in the second status.

19. The mobile terminal of claim 1, further comprising:

a camera disposed on the front surface and configured to recognize eye pupils of a user, wherein the controller is further configured to operate the front notification unit when the event is generated when the eye pupils of the user are recognized.

20. The mobile terminal of claim 1, wherein the controller is further configured to control the rear notification unit to change a color or a flickering speed according to information related to the event.

* * * * *